(12) United States Patent
Chrétien et al.

(10) Patent No.: US 8,916,084 B2
(45) Date of Patent: *Dec. 23, 2014

(54) ULTRA-VIOLET CURABLE GELLANT INKS FOR THREE-DIMENSIONAL PRINTING AND DIGITAL FABRICATION APPLICATIONS

(75) Inventors: Michelle N. Chrétien, Mississauga (CA); Barkev Keoshkerian, Thornhill (CA); Peter G. Odell, Mississauga (CA); Jennifer L. Belelie, Oakville (CA); Christopher A. Wagner, Toronto (CA); Naveen Chopra, Oakville (CA)

(73) Assignee: Xerox Corporation, Norwalk, CT (US)

( * ) Notice: Subject to any disclaimer, the term of this patent is extended or adjusted under 35 U.S.C. 154(b) by 1392 days.

This patent is subject to a terminal disclaimer.

(21) Appl. No.: 12/204,307

(22) Filed: Sep. 4, 2008

(65) Prior Publication Data

US 2010/0055484 A1   Mar. 4, 2010

(51) Int. Cl.
| | |
|---|---|
| *C08F 2/48* | (2006.01) |
| *B29C 67/00* | (2006.01) |
| *B41M 7/00* | (2006.01) |
| *C09D 11/101* | (2014.01) |
| *C09D 11/34* | (2014.01) |

(52) U.S. Cl.
CPC .......... *B41M 7/0081* (2013.01); *B29C 67/0055* (2013.01); *C09D 11/101* (2013.01); *C09D 11/34* (2013.01)
USPC ............................ 264/401; 264/494; 264/496

(58) Field of Classification Search
USPC .......................... 264/401, 494, 496
See application file for complete search history.

(56) References Cited

U.S. PATENT DOCUMENTS

| | | | |
|---|---|---|---|
| 4,490,731 A | 12/1984 | Vaught | 347/88 |
| 4,889,560 A | 12/1989 | Jaeger et al. | 106/31.29 |
| 4,889,761 A | 12/1989 | Titterington et al. | 428/32.1 |
| 5,221,335 A | 6/1993 | Williams et al. | 524/560 |
| 5,286,573 A * | 2/1994 | Prinz et al. | 264/308 |
| 5,372,852 A | 12/1994 | Titterington et al. | 427/288 |
| 5,496,879 A | 3/1996 | Griebel et al. | 524/320 |
| 5,621,022 A | 4/1997 | Jaeger et al. | 523/161 |
| 5,627,578 A | 5/1997 | Weintraub | 347/101 |
| 5,855,836 A * | 1/1999 | Leyden et al. | 264/401 |
| 6,004,419 A | 12/1999 | Torii | |
| 6,644,763 B1 | 11/2003 | Gothait | 347/1 |
| 6,841,116 B2 * | 1/2005 | Schmidt | 264/401 |

(Continued)

FOREIGN PATENT DOCUMENTS

EP    2 028 240 A1    2/2009

OTHER PUBLICATIONS

European Search Report, Application No. 09167866.4-2102, dated Dec. 23, 2009, 5 pages.

(Continued)

*Primary Examiner* — Galen Hauth
(74) *Attorney, Agent, or Firm* — Marylou J. Lavoie

(57) ABSTRACT

A method for fabricating a three-dimensional object including depositing a first amount of an ultraviolet curable phase change ink composition comprising an optional colorant and a phase change ink vehicle comprising a radiation curable monomer or prepolymer; a photoinitiator; a reactive wax; and a gellant upon a print region surface; successively depositing additional amounts of the ultraviolet curable phase change ink composition to create a three-dimensional object; and curing the ultraviolet curable phase change ink composition.

17 Claims, 1 Drawing Sheet

(56) References Cited

U.S. PATENT DOCUMENTS

| | | | | |
|---|---|---|---|---|
| 6,896,937 | B2* | 5/2005 | Woudenberg | 427/511 |
| 7,259,275 | B2 | 8/2007 | Belelie et al. | 560/169 |
| 7,271,284 | B2 | 9/2007 | Toma et al. | 560/169 |
| 7,276,614 | B2 | 10/2007 | Toma et al. | 554/37 |
| 7,279,587 | B2 | 10/2007 | Odell et al. | 554/37 |
| 7,358,283 | B2 | 4/2008 | Xu | 522/42 |
| 7,378,460 | B2 | 5/2008 | Schmidt et al. | 523/160 |
| 7,399,796 | B2 | 7/2008 | Xu et al. | 523/160 |
| 7,402,273 | B2 | 7/2008 | Sherwood | 264/494 |
| 2007/0058020 | A1* | 3/2007 | Wetjens et al. | 347/102 |
| 2007/0120910 | A1 | 5/2007 | Odell et al. | 347/88 |
| 2007/0120925 | A1 | 5/2007 | Belelie et al. | 347/100 |
| 2007/0123606 | A1 | 5/2007 | Toma et al. | 523/160 |
| 2007/0123723 | A1* | 5/2007 | Odell et al. | 554/36 |
| 2007/0142492 | A1* | 6/2007 | Odell et al. | 522/74 |
| 2007/0296773 | A1* | 12/2007 | Sharma et al. | 347/75 |
| 2008/0000384 | A1 | 1/2008 | Belelie et al. | |
| 2008/0087190 | A1 | 4/2008 | Iftime et al. | 106/31.15 |
| 2008/0090928 | A1 | 4/2008 | Iftime et al. | 522/75 |
| 2008/0121727 | A1 | 5/2008 | Iftime et al. | 235/494 |
| 2008/0122914 | A1 | 5/2008 | Toma et al. | |
| 2008/0151310 | A1 | 6/2008 | Kazmaier et al. | 358/3.28 |
| 2008/0204538 | A1 | 8/2008 | Kovacs et al. | |
| 2008/0218540 | A1 | 9/2008 | Iftime et al. | |
| 2008/0218570 | A1 | 9/2008 | Kovacs et al. | |
| 2010/0053287 | A1 | 3/2010 | Belelie et al. | |
| 2010/0055407 | A1 | 3/2010 | Belelie et al. | |
| 2010/0055415 | A1 | 3/2010 | Belelie et al. | |
| 2010/0055423 | A1 | 3/2010 | Chretien et al. | |
| 2010/0055484 | A1 | 3/2010 | Chretien et al. | |

OTHER PUBLICATIONS

Canadian Patent Office Communication dated Nov. 30, 2010, for Canadian Patent application No. 2,676,879, 2 pages.

Commonly Assigned, co-pending U.S. Appl. No. 12/204,269, of Jennifer L. Belelie, et al., entitled "Ultra-Violet Curable Gellant Inks for Braille, Raised Print, and Regular Print Applications" 68 pages of specification, 3 drawing sheets, not yet published.

Commonly Assigned, co-pending U.S. Appl. No. 12/204,323, of Jennifer L. Belelie, et al., entitled "Ultra-Violet Curable Gellant Inks for Tactile and Regular Print Applications as Security Features for Signature and Document Authentication" 57 pages of specification, 1 drawing sheets, not yet published.

Commonly Assigned, co-pending U.S. Appl. No. 12/204,410, of Jennifer L. Belelie, et al., entitled "Ultra-Violet Curable Gellant Inks for Creating Tactile Text and Images for Packing Applications" 62 pages of specification, 3 drawing sheets, not yet published.

Commonly Assigned, co-pending U.S. Appl. No. 12/204,462, of Michelle N. Chrétien, et al., entitled "Machine Readable Code Comprising Ultra-Violet Curable Gellant Inks" 63 pages of specification, 4 drawing sheets, not yet published.

U.S. Patent Application filed Mar. 7, 2007, of Gabriel Iftime, et al., U.S. Appl. No. 11/683,011, entitled "Dual Printer for Regular and Raised Print" 18 pages of specification, 2 drawing sheets, not yet published.

English Abstract for German Patent Publication DE 4205636AL, Aug. 1993.

English Abstract for German Patent Publication DE 4205713AL, Mar. 1996.

D. Mager, et al., "Phase Change Rapid Prototyping With Aqueous Inks," NIP23 and Digital Fabrication 2007 Conference Proceedings, pp. 908-911.

"Dimer Acids," Kirk-Othmer Encyclopedia of Chemical Technology, vol. 8, 4th Ed. (1992), pp. 223 to 237.

Advisory Action issued in U.S. Appl. No. 12/204,462, mailed Oct. 13, 2011, 5 pages.

Final Rejection issued in U.S. Appl. No. 12/204,462, mailed Aug. 1, 2011, 9 pages.

Non-Final Office Action issued in U.S. Appl. No. 12/204,462, mailed Apr. 4, 2011, 30 pages.

Advisory Action issued in U.S. Appl. No. 12/204,269, mailed Oct. 11, 2011, 4 pages.

Final Rejection issued in U.S. Appl. No. 12/204,269, mailed May 26, 2011, 18 pages.

Non-Final Office Action issued in U.S. Appl. No. 12/204,269, mailed Nov. 24, 2010, 23 pages.

Non-Final Office Action issued in U.S. Appl. No. 12/204,410, mailed Aug. 18, 2011, 105 pages.

Canadian Patent Office Communication dated Oct. 13, 2011, for Canadian Patent application No. 2,676,879, 2 pages.

Canadian Patent Office Communication dated Jun. 12, 2012, for Canadian Patent application No. 2,676,879, 1 page.

European Patent Office Communication dated Jun. 1, 2012, for European Patent application No. 09 167 886.4-2102, 63 pages.

\* cited by examiner

US 8,916,084 B2

ULTRA-VIOLET CURABLE GELLANT INKS FOR THREE-DIMENSIONAL PRINTING AND DIGITAL FABRICATION APPLICATIONS

RELATED CASES

Commonly assigned, co-pending U.S. patent application of Jennifer L. Belelie, Michelle N. Chrétien, Barkev Keoshkerian, Gabriel Iftime, Naveen Chopra, Christopher A. Wagner, Peter G. Odell, and Paul F. Smith, Ser. No. 12/204,269, entitled "Ultra-violet Curable Gellant Inks for Braille, Raised Print, and Regular Print Applications," filed of even date herewith, which is hereby incorporated by reference herein in its entirety, describes, in embodiments, an ink jet printing device including an ink jet print head and a print region surface toward which ink is jetted from the ink jet print head, wherein a height distance between the ink jet print head and the print region surface is adjustable; wherein the ink jet print head jets an ultra-violet curable phase change ink composition comprising an optional colorant and a phase change ink vehicle comprising a radiation curable monomer or prepolymer; a photoinitiator; a reactive wax; and a gellant, wherein a print deposited upon the print region surface is Braille, raised print, or a combination of regular print and one or both Braille and raised print.

Commonly assigned, co-pending U.S. patent application of Jennifer L. Belelie, Michelle N. Chrétien, Naveen Chopra, and Barkev Keoshkerian, Ser. No. 12/204,323, entitled "Ultra-violet Curable Gellant Inks for Tactile and Regular Print Applications as Security Feature for Signature and Document Authentication," filed of even date herewith, which is hereby incorporated by reference herein in its entirety, describes, in embodiments, a system and method for creating an authentication mark on a recording medium by depositing marking material on a medium in an image area to create a marking material image and to create a marking material authentication image. The marking material comprises an ultraviolet curable phase change ink composition comprising an optional colorant and a phase change ink vehicle comprising a radiation curable monomer or prepolymer; a photoinitiator; a reactive wax; and a gellant. A predetermined amount of additional marking material is further deposited upon the medium in the authentication image area to increase an amount of marking material associated with the marking material authentication image in the authentication image area. The fixed marking material associated with the authentication image area is a tactilely perceptible authentication mark having a height, with respect to a surface of the medium, that is tactilely perceptible, wherein the fixed marking material associated with the marking material image area is tactilely non-perceptible.

Commonly assigned, co-pending U.S. patent application of Jennifer L. Belelie, Michelle N. Chrétien, Naveen Chopra, Barkev Keoshkerian, and Steve E. Ready, Ser. No. 12/204,410, entitled "Tactile Text and Images for Packaging Applications," filed of even date herewith, which is hereby incorporated by reference herein in its entirety, describes, in embodiments, a method for forming tactile images or a combination of tactile images and regular images, on a flexible packaging substrate comprising depositing an ultraviolet curable phase change ink composition comprising an optional colorant and a phase change ink vehicle comprising a radiation curable monomer or prepolymer; a photoinitiator; a reactive wax; and a gellant directly onto a flexible packaging substrate or depositing the ink onto an intermediate transfer member, in an image area to form a tactile image area or a combination of tactile image area and regular image; forming the tactile image by depositing multiple layers of the ink in locations of the tactile image or portion thereof; when an intermediate transfer member is used, transferring the deposited ink from the intermediate transfer member to the flexible packaging substrate; and curing the ink.

Commonly assigned, co-pending U.S. patent application of Michelle N. Chrétien, Jennifer L. Belelie, Barkev Keoshkerian, and Gabriel Iftime, Ser. No. 12/204,462, entitled "Ultra-violet Curable Gellant Inks for Document Security Applications," filed of even date herewith, which is hereby incorporated by reference herein in its entirety, describes, in embodiments, a machine readable code comprising a set of printed markings created with an ultra-violet curable phase change ink comprising an optional colorant and a phase change ink vehicle comprising a radiation curable monomer or prepolymer; a photoinitiator; a reactive wax; and a gellant; wherein each printed marking of the set has a predetermined print height on a substrate and represents a predetermined data value, wherein the set of printed markings includes printed markings representing different data value and having different print heights.

BACKGROUND

Disclosed herein are ultra-violet curable gellant inks for three-dimensional printing, digital fabrication, and rapid prototyping applications. Also described is a method for forming three-dimensional images and objects with the described ultra-violet curable gellant inks.

Analog manufacturing is moving towards, and is expected to one day be consumed, by digital manufacturing. This shift is customer driven and arises from a desire for more customized products, on-demand delivery, and other market factors that support the move towards a less expensive alternative to traditional manufacturing. Digital fabrication encompasses a range of technologies.

Current technologies for three-dimensional printing include stereolithography and rapid prototyping. While suitable for some purposes, these technologies each have their own limitations. Stereolithography is a costly process with machines often costing in excess of $250,000. The polymer materials employed are also extremely expensive, with a common stereolithography photopolymer costing about $800 per gallon. Rapid prototyping systems typically use a fused deposition method wherein molten acrylonitrile-butadiene-styrene (ABS) polymer is deposited. The extremely rapid solidification of the ABS manifests in ridges that form on the finished object. Post-printing treatment of the prototype (such as sanding or polishing) is required to render a smooth object.

The concept of "freezing" or phase-change has been described for three-dimensional printing using aqueous inks on a chilled (that is, sub-zero temperature) substrate. See D. Mager et al., "Phase Change Rapid Prototyping With Aqueous Inks," NIP23 and Digital Fabrication 2007 Conference Proceedings, pages 908-911, which is hereby incorporated by reference herein. Ink jet fabrication using wax based materials has been described but is disadvantaged by the fact that the resulting primary structures are neither robust nor permanent.

Commonly assigned, co-pending U.S. patent application of Peter M. Kazmaier, Hadi K. Mahabadi, Paul F. Smith, Chris A. Wagner, Gabriel Iftime, and Tyler B. Norsten, Ser. No. 11/613,759, entitled "Tactile Security Feature for Document and Signature Authentication," filed Dec. 20, 2006, which is hereby incorporated by reference herein in its entirety, describes, in embodiments, a system and method create an authentication mark on a recording medium by depositing marking material on a medium in an image area to create a marking material image and to create a marking material authentication image. A predetermined amount of additional marking material is further deposited upon the medium in the authentication image area to increase an amount of marking material associated with the marking material authentication image in the authentication image area. The fixed marking material associated with the authentication image area is a tactilely perceptible authentication mark wherein the fixed marking material associated with the authentication mark has a height, with respect to a surface of the medium, that is tactilely perceptible.

U.S. Pat. No. 6,644,763 describes a method for creating raised and special printing effects using ink jet technology. The method includes the steps of depositing a light curable photo-polymer material on the area selected for the printing effects, and curing the area. The amount of material to be deposited corresponds to the area selected for the printing effects and the height of the raised area relative to the medium on which the photo-polymer material is deposited. See the Abstract.

U.S. Pat. No. 5,627,578 describes a method and device for raised letter or graphics printing, by means of a sprayed wet ink deposition on a print substrate. Subsequent dispensing of thermographic powder thereon, with adherence of the powder only to the wet ink, followed by heating to a fixing temperature of the powder, results in the raised lettering or graphics. A standard portable ink jet printer of the bubble jet type, controlled, with graphics software control, by a personal computer, provides the requisite non-contacting ink deposition. The dispensing cartridges of the ink jet printer are provided with non-contact-drying ink formulations (with two or more separate colors, if desired) for the portion of graphics or printing which is to be in raised form. A thermographic powder dispenser and heating member is connected to the output of the ink jet printer, or integrated therewith for completion of the raised printing process. Raised and non-raised printing is also possible by use of separately dispensed drying and non-drying inks. See the Abstract.

Ink jet printing devices are known in the art. For example, ink jet printing devices are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are generally three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (that is, liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device, the image is applied by jetting appropriately colored inks during four to eighteen rotations (incremental movements) of a substrate, such as an image receiving member or intermediate transfer member, with respect to the ink jetting head. That is, there is a small translation of the print head with respect to the substrate in between each rotation. This approach simplifies the print head design, and the small movements ensure good droplet registration. At the jet operating temperature, droplets of liquid ink are ejected from the printing device. When the ink droplets contact the surface of the recording substrate, they quickly solidify to form a predetermined pattern of solidified ink drops.

Ink jet printing processes may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing solid ink for printing on a substrate such as paper. In thermal ink jet printing processes employing hot melt inks, the solid ink is melted by the heater in the printing apparatus and utilized (jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

The use of ink jet printers in forming raised printed images is also known, for example, as indicated in U.S. Pat. Nos. 6,644,763 and 5,627,578 above.

Commonly assigned, co-pending U.S. patent application of Gabriel Iftime et al, Ser. No. 11/683,011, entitled "Dual Printer for Regular and Raised Print," filed Mar. 7, 2007, which is hereby incorporated by reference hereinabove in its entirety, describes a cost-effective ink jet printing device that is capable of forming both regular print images and raised print images.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No.

5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Radiation curable inks generally comprise at least one curable monomer, a colorant, and a radiation activated initiator, specifically a photoinitiator, that initiates polymerization of curable components of the ink, specifically of the curable monomer.

U.S. Pat. No. 7,279,587 of Peter G. Odell, Eniko Toma, and Jennifer L. Belelie, the disclosure of which is totally incorporated herein by reference, discloses photoinitiating compounds useful in curable phase change ink compositions. In embodiments, a compound of the formula

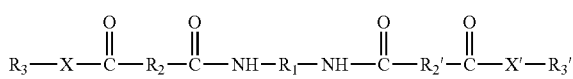

is disclosed wherein $R_1$ is an alkylene, arylene, arylalkylene, or alkylarylene group, $R_2$ and $R_2'$ each, independently of the other, are alkylene, arylene, arylalkylene, or alkylarylene groups, $R_3$ and $R_3'$ each, independently of the other, are either (a) photoinitiating groups, or (b) groups which are alkyl, aryl, arylalkyl, or alkylaryl groups, provided that at least one of $R_3$ and $R_3'$ is a photoinitiating group, and X and X' each, independently of the other, is an oxygen atom or a group of the formula $-NR_4-$, wherein $R_4$ is a hydrogen atom, an alkyl group, an aryl group, an arylalkyl group, or an alkylaryl group.

U.S. Patent Publication 20070120910, Ser. No. 11/290,202, Published May 31, 2007, of Peter G. Odell, Eniko Toma, and Jennifer L. Belelie, entitled "Phase Change Inks Containing Photoinitiator With Phase Change Properties and Gellant Affinity," which is hereby incorporated by reference herein in its entirety, describes, in embodiments, a phase change ink comprising a colorant, an initiator, and an ink vehicle, said ink vehicle comprising (a) at least one radically curable monomer compound, and (b) a compound of the formula

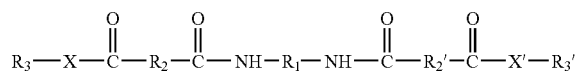

wherein $R_1$ is an alkylene, arylene, arylalkylene, or alkylarylene group, $R_2$ and $R_2'$ each, independently of the other, are alkylene, arylene, arylalkylene, or alkylarylene groups, $R_3$ and $R_3'$ each, independently of the other, are either (a) photoinitiating groups, or (b) groups which are alkyl, aryl, arylalkyl, or alkylaryl groups, provided that at least one of $R_3$ and $R_3'$ is a photoinitiating group, and X and X' each, independently of the other, is an oxygen atom or a group of the formula $-NR_4-$, wherein $R_4$ is a hydrogen atom, an alkyl group, an aryl group, an arylalkyl group, or an alkylaryl group.

U.S. Pat. No. 7,279,587 of Jennifer L. Belelie, Adela Goredema, Peter G. Odell, and Eniko Toma entitled "Method for Preparing Curable Amide Gellant Compounds," issued Aug. 21, 2007, which is hereby incorporated by reference herein in its entirety, describes, in embodiments, a process for preparing a compound of the formula

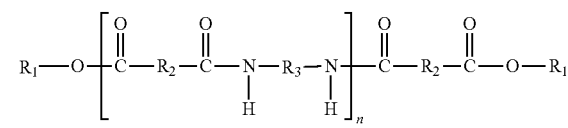

wherein $R_1$ is an alkyl group having at least one ethylenic unsaturation, an arylalkyl group having at least one ethylenic unsaturation, or an alkylaryl group having at least one ethylenic unsaturation, $R_2$ and $R_3$ each, independently of the others, are alkylene groups, arylene groups, arylalkylene groups, or alkylarylene groups, and n is an integer representing the number of repeat amide units and is at least 1, said process comprising: (a) reacting a diacid of the formula

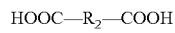

with a diamine of the formula

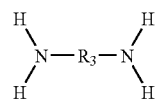

in the absence of a solvent while removing water from the reaction mixture to form an acid-terminated oligoamide intermediate; and (b) reacting the acid-terminated oligoamide intermediate with a monoalcohol of the formula

in the presence of a coupling agent and a catalyst to form the product.

U.S. Pat. No. 7,276,614 of Eniko Toma, Peter G. Odell, Adela Goredema, and Jennifer L. Belelie, entitled "Curable Amide Gellant Compounds," issued Oct. 2, 2007, which is hereby incorporated by reference herein in its entirety, describes, in embodiments, a compound of the formula

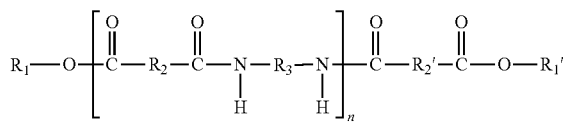

wherein $R_1$ and $R_1'$ each, independently of the other, is an alkyl group having at least one ethylenic unsaturation, an arylalkyl group having at least one ethylenic unsaturation, or an alkylaryl group having at least one ethylenic unsaturation, $R_2$, $R_2'$, and $R_3$ each, independently of the others, are alkylene groups, arylene groups, arylalkylene groups, or alkylarylene groups, and n is an integer representing the number of repeat amide units and is at least 1.

U.S. Patent Publication 20070123606, Ser. No. 11/290,121, Published May 31, 2007, of Eniko Toma, Jennifer L. Belelie, and Peter G. Odell entitled "Phase Change Inks Containing Curable Amide Gellant Compounds," which is hereby incorporated by reference herein in its entirety, describes, in embodiments, a phase change ink comprising a colorant, an initiator, and a phase change ink carrier, said carrier comprising at least one radically curable monomer compound and a compound of the formula

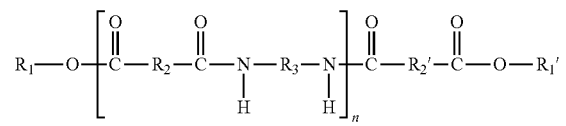

wherein $R_1$ and $R_1'$ each, independently of the other, is an alkyl group having at least one ethylenic unsaturation, an arylalkyl group having at least one ethylenic unsaturation, or an alkylaryl group having at least one ethylenic unsaturation, $R_2$, $R_2'$, and $R_3$ each, independently of the others, are alkylene groups, arylene groups, arylalkylene groups, or alkylarylene groups, and n is an integer representing the number of repeat amide units and is at least 1.

U.S. Pat. No. 7,271,284 of Eniko Toma, Adela Goredema, Jennifer L. Belelie, and Peter G. Odell entitled "Process for Making Curable Amide Gellant Compounds," issued Sep. 18, 2007, which is hereby incorporated by reference herein in its entirety, describes, in embodiments, a process for preparing a compound of the formula

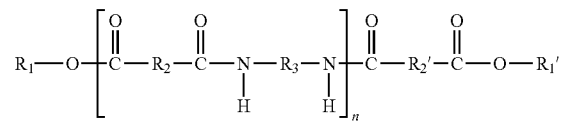

having substituents as defined therein.

The appropriate components and process aspects of the each of the foregoing U.S. Patents and Patent Publications may be selected for the present disclosure in embodiments thereof.

Digital fabrication or rapid prototyping using non-impact printing technology is beginning to impact a wide range of technical disciplines including biotechnology, combinatorial chemistry, electronics, displays, MEMS (microelectromechanical systems) devices, photovoltaics, and organic semiconductors. Currently available materials for ink jet based digital fabrication are suitable for their intended purposes. However a need remains for improved materials suitable for use in non-impact three dimensional printing including digital manufacturing and rapid prototyping applications. Further needed is a marking material for ink jet based three-dimensional printing, digital fabrication, and rapid prototyping applications providing a final object having improved robustness, a method providing ease, simplicity of use, flexibility and tunability (that is, adaptability for different applications).

SUMMARY

Described is an ultra-violet curable gellant ink for three dimensional printing, rapid prototyping and digital fabrication applications. Also described is a method for forming three-dimensional images or objects with the described ultraviolet curable gellant inks comprising an optional colorant, an optional functional particle, and a phase change ink vehicle comprising at least one radiation curable monomer or prepolymer, a photoinitiator, a reactive wax, and a gellant. In embodiments, a method for fabricating a three-dimensional object comprises depositing a first amount of an ultraviolet curable phase change ink composition comprising an optional colorant and a phase change ink vehicle comprising a radiation curable monomer or prepolymer; a photoinitiator; a reactive wax; and a gellant upon a substrate; successively depositing additional amounts of the ultraviolet curable phase change ink composition to create a three-dimensional object; and curing the ultraviolet curable phase change ink composition.

Further disclosed are improved materials suitable for use in non-impact printing technologies, for example, ink jet printing devices, for three dimensional printing including digital fabrication, digital manufacturing and rapid prototyping applications. The present materials undergo a room-temperature phase change and provide ink jet based digital fabrication achieving a final object that is robust and a process that provides ease and simplicity of use, flexibility and tunability. The unique fluid chemistry of the present inks enables digital fabrication of two and three dimensional structures at physical scales from nanometers to meters and beyond. In embodiments, the rheological properties of the present digital fabrication material can be tuned to achieve robust jetting at elevated temperatures [for example, about 85° C.] and a degree of mechanical stability (for example, from about $10^5$ to about $10^6$ centipoise) at ambient substrate temperatures (i.e., room temperature). The gel nature of the material at room temperature prevents spread or migration of the printed droplet and allows for facile build-up of three-dimensional structures. Advantageously, in embodiments, complex parts can be produced from the ultraviolet curable gellant phase change ink composition in an additive fashion as opposed to conventional fabrication techniques, which are generally subtractive in nature. Further advantages include lower cost material as compared to current digital fabrication and rapid prototyping materials, smoother features as compared to objects prepared using fused deposition techniques, and tunable properties such as selection of colorless or colored materials, including pigmented materials, phase transition temperature, gel strength, viscosity, and selected added functionality such as enhanced robustness or selected texture, for example, including, but not limited to, adhesion promoters for desired substrates, nanoparticles, and metallic particles. For example, in embodiments, silica particles of specific sizes can be selected to enhance robustness in printed inks or to provide a roughness or texture to the fabricated object.

DETAILED DESCRIPTION

Figure 1:
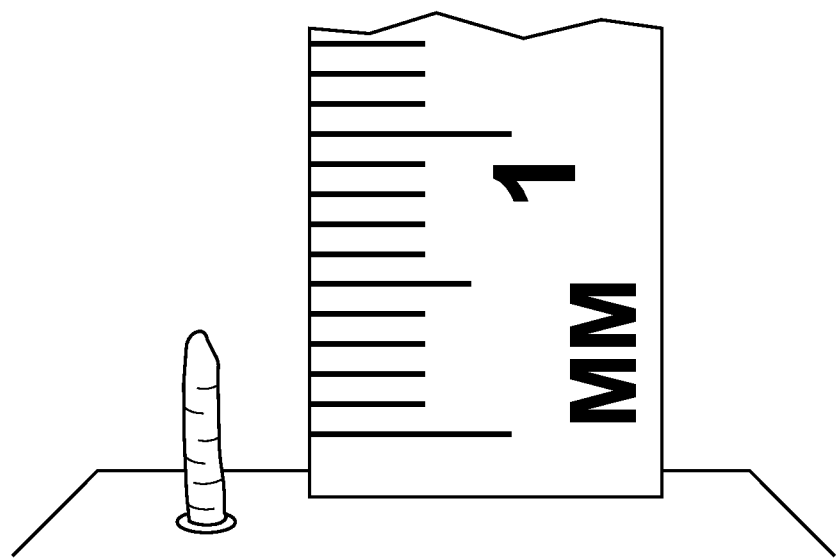
FIG. 1 is an illustration of a free-standing post created by depositing the present ink material onto a substrate and curing.

In embodiments herein, radiation curable phase change inks are provided as materials for fabricating three dimensional objects. Fabrication techniques can include, for example, inkjet-based digital fabrication and rapid prototyping technologies. These materials are comprised of radiation curable monomers, prepolymers, and/or oligomers, a photoinitiator package, a reactive wax, and a gellant. Pigments or other functional particles may be optionally included depending on the desired application. The rheological properties of the present digital fabrication ink materials can be tuned to achieve robust jetting at elevated temperatures (for example, in embodiments, about 85° C.) and a degree of mechanical stability (for example, in embodiments, about $10^5$ to about $10^6$ centipoise) at ambient substrate temperatures (i.e. room temperature). The increase in viscosity to from about $10^5$ to from about $10^6$ centipoise allows the structure to be built up. Before curing, however, the structures may have a consistency resembling tooth paste and can be altered by touch. By curing, the structures are rendered quite robust. The gel nature of the present materials at room temperature prevents spread or migration of the printed droplet and allows for facile build-up of three-dimensional structures. Due to the radiation curable nature of this material, the printed object can be cured by exposure to ultraviolet radiation at any point in the fabrication process resulting in robust objects with a high degree of mechanical strength. In specific embodiments herein, the radiation curable phase change gellant inks herein can be cured after deposition of each layer of the three-dimensional object is deposited if desired. Alternately, in the interest of time, the inks can be cured upon completion of deposition of all layers of the three-dimensional object.

In embodiments, the method herein comprises depositing successive layers of the curable ink to form an object having a selected height and shape. The successive layers of the curable ink can be deposited to a build platform or to a previous layer of solidified material in order to build up a three-dimensional object in a layerwise fashion. In embodiments herein, objects of virtually any design can be created, from a micro-sized scale to a macro-sized scale and can include simple objects to objects having complex geometries. The ink jet materials and method herein further advantageously provide a non-contact, additive process (as opposed to subtractive process such as computer numerical control machining) providing the built-in ability to deliver metered amounts of the present ink materials to a precise location in time and space.

In specific embodiments, the ink vehicles disclosed herein can comprise any suitable curable monomer or prepolymer. Examples of suitable materials include radiation curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Different monomer and oligomers can also be added to tune the plasticity or elasticity of the cured objects. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 80 percent by weight of the carrier, and in another embodiment no more than about 70 percent by weight of the carrier, although the amount of diluent can be outside of these ranges.

In embodiments, the ink vehicles contain at least one compound that can exhibit gel-like behavior in that it undergoes a relatively sharp increase in viscosity over a relatively narrow temperature range when dissolved in a liquid such as those compounds that behave as curable monomers when exposed to radiation such as ultraviolet light. One example of such a liquid curable monomer is a propoxylated neopentyl glycol diacrylate such as SR9003, commercially available from Sartomer Co. Inc.

In one embodiment, some compounds as disclosed herein undergo a change in viscosity of at least about $10^3$ centipoise, in another embodiment at least about $10^5$ centipoise, and in yet another embodiment at least about $10^6$ centipoise over a temperature range of in one embodiment at least about 30° C., in another embodiment at least about 10° C., and in yet another embodiment at least about 5° C., although the viscosity change and temperature range can be outside of these ranges, and compounds that do not undergo changes within these ranges are also included herein.

At least some embodiments of the compounds disclosed herein can form a semi-solid gel at a first temperature. For example, when the compound is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, or the like, which, upon stimulation by physical forces, such as temperature, mechanical agitation, or the like, or chemical forces, such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

In specific embodiments, the ink vehicles disclosed herein can comprise any suitable photoinitiator. Examples of specific initiators include, but are not limited to, Irgacure® 127, Irgacure® 379, and Irgacure® 819, all commercially available from Ciba Specialty Chemicals, among others. Further examples of suitable initiators include (but are not limited to) benzophenones, benzyl ketones, monomeric hydroxyl ketones, polymeric hydroxyl ketones, α-alkoxy benzyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE and DAROCUR from Ciba, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, 2,4,6-trimethylbenzoyldiphenylphosphine oxide (available as BASF LUCIRIN TPO), 2,4,6-trimethylbenzoylethoxyphenylphosphine oxide (available as BASF LUCIRIN TPO-L), bis(2,4,6-trimethylbenzoyl)-phenyl-phosphine oxide (available as Ciba IRGACURE 819) and other acyl phosphines, 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959), 2-benzyl 2-dimethylamino 1-(4-morpholinophenyl) butanone-1 (available as Ciba IRGACURE 369), 2-hydroxy-1-(4-(4-(2-hydroxy-2-methylpropionyl)-benzyl)-phenyl)-2-methylpropan-1-one (available as Ciba IRGACURE 127), 2-dimethylamino-2-(4-methylbenzyl)-1-(4-morpholin-4-ylphenyl)-butanone (available as Ciba IRGACURE 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl)phosphine oxide, 2,4,6-trimethylbenzoylphenylphosphinic acid ethyl ester, oligo(2-hydroxy-2-methyl-1-(4-(1-methylvinyl)phenyl)propanone), 2-hydroxy-2-methyl-1-phenyl-1-propanone, benzyl-dimethylketal, and the like, as well as mixtures thereof.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

Optionally, the photoinitiator is present in the phase change ink in any desired or effective amount, in one embodiment at least about 0.5 percent by weight of the ink composition, and in another embodiment at least about 1 percent by weight of the ink composition, and in one embodiment no more than about 15 percent by weight of the ink composition, and in another embodiment no more than about 10 percent by weight of the ink composition, although the amount can be outside of these ranges.

Any suitable reactive wax can be used for the phase change in vehicles disclosed herein. In embodiments, the reactive wax comprises a curable wax component that is miscible with the other components and that will polymerize with the curable monomer to form a polymer. Inclusion of the wax promotes an increase in viscosity of the ink as it cools from the jetting temperature.

Suitable examples of waxes include, but are not limited to, those that are functionalized with curable groups. The curable groups may include, but are not limited to, acrylate, methacrylate, alkene, allylic ether, epoxide and oxetane. These waxes can be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3-(CH_2)_n-CH_2OH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

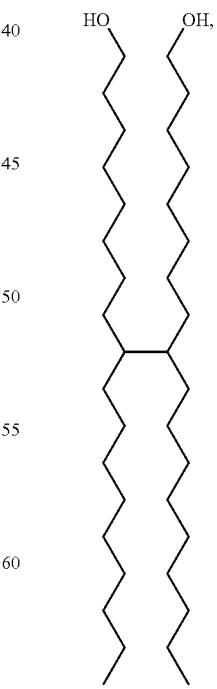

as well as other branched isomers which may include unsaturations and cyclic groups, available from Uniqema, New Castle, Del. Further information on C36 dimer diols of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that may be functionalized with a curable group include, but are not limited to, mixtures of carbon chains with the structure $CH_3-(CH_2)_n-COOH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with Mn equal to approximately 390, 475, 565 and 720 g/mol, respectively. Other suitable waxes have a structure $CH_3-(CH_2)_n-COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

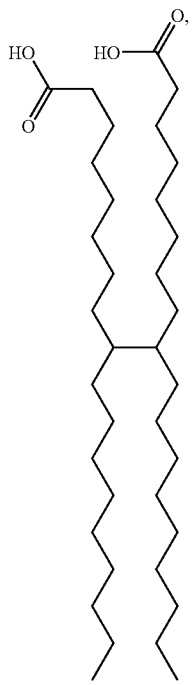

as well as other branched isomers which may include unsaturations and cyclic groups, available from Uniqema, New Castle, Del.; further information on C36 dimer acids of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference) can also be used. These carboxylic acids can be reacted with alcohols equipped with UV curable moieties to form reactive esters. Examples of these alcohols include, but are not limited to, 2-allyloxyethanol from Sigma-Aldrich Co.;

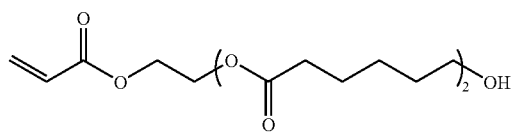

SR495B from Sartomer Company, Inc.;

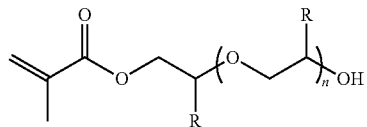

CD572 (R=H, n=10) and SR604 (R=Me, n=4) from Sartomer Company, Inc.

In embodiments, the optional curable wax is included in the ink in an amount of from, for example, about 1 to about 25% by weight of the ink, or from about 2 to about 20% by weight of the ink, or from about 2.5 to about 15% by weight of the ink, although the amounts can be outside of these ranges.

The curable monomer or prepolymer and curable wax together can form more than about 50% by weight of the ink, or at least 70% by weight of the ink, or at least 80% by weight of the ink, although not limited.

Any suitable gellant can be used for the ink vehicles disclosed herein. In embodiments, a gellant such as described in U.S. patent application Ser. No. 11/290,202, filed Nov. 30, 2005, entitled "Phase Change Inks Containing Photoinitiator With Phase Change Properties and Gellant Affinity," with the named inventors Peter G. Odell, Eniko Toma, and Jennifer L. Belelie, the disclosure of which is totally incorporated herein by reference, can be used, wherein the gellant is a compound of the formula

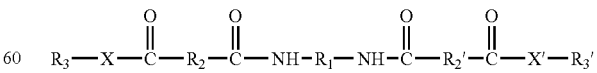

wherein $R_1$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 12 carbon atoms, in another embodiment with no more than about 4 carbon atoms, and in yet another embodiment with no more than about 2 carbon atoms, although the number of carbon atoms can be outside of these ranges, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 6 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 54 carbon atoms, and in another embodiment with no more than about 36 carbon atoms, although the number of carbon atoms can be outside of these ranges, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 7 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 8 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

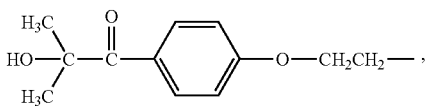

groups derived from 1-hydroxycyclohexylphenylketone, of the formula

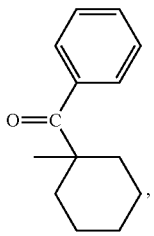

groups derived from 2-hydroxy-2-methyl-1-phenylpropan-1-one, of the formula

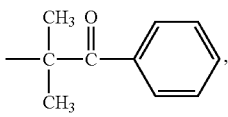

groups derived from N,N-dimethylethanolamine or N,N-dimethylethylenediamine, of the formula

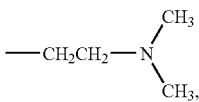

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (ii) an aryl group (including substituted and unsubstituted aryl groups, and wherein heteroatoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

provided that at least one of $R_3$ and $R_3'$ is a photoinitiating group;

and X and X' each, independently of the other, is an oxygen atom or a group of the formula —NR$_4$—, wherein R$_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, in one embodiment with at least 1 carbon atom, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iii) an aryl group, including substituted and unsubstituted aryl groups, and wherein heteroatoms either may or may not be present in the aryl group, in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, wherein the substituents on the substituted alkyl, aryl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, R$_2$ and R$_2$' are the same as each other; in another specific embodiment, R$_2$ and R$_2$' are different from each other. In one specific embodiment, R$_3$ and R$_3$' are the same as each other; in another specific embodiment, R$_3$ and R$_3$' are different from each other.

In one specific embodiment, R$_2$ and R$_2$' are each groups of the formula —C$_{34}$H$_{56+a}$— and are branched alkylene groups which may include unsaturations and cyclic groups, wherein a is an integer of 0, 1, 2, 3, 4, 5, 6, 7, 8, 9, 10, 11, or 12, including (but not limited to) isomers of the formula

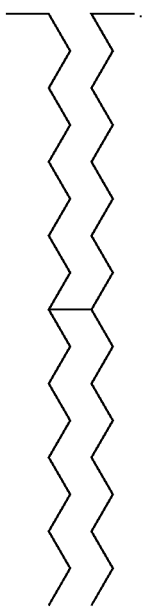 [SMILES: CCCCCCCCCC(CCCCCCCC)C(CCCCCCCC)CCCCCCCCC]

In one specific embodiment, R$_1$ is an ethylene (—CH$_2$CH$_2$—) group.

In one specific embodiment, R$_3$ and R$_3$' are both

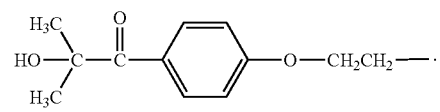

In one specific embodiment, the compound is of the formula

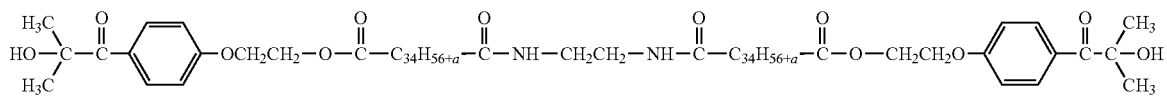

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12, including (but not limited to) isomers of the formula wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein m is an integer, including but not limited to

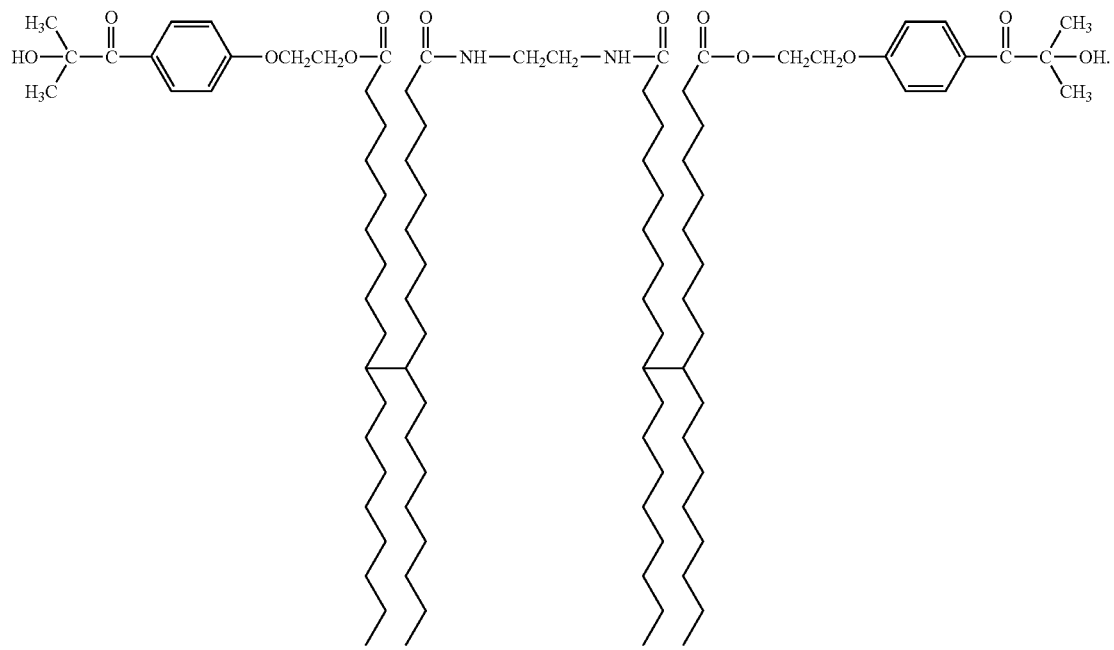 [SMILES: CCCCCCCCC(CCCCCCCCC(=O)NCCNC(=O)CCCCCCCCC(CCCCCCCC)C(CCCCCCCC)CCCCCCCCC(=O)OCCOc1ccc(C(=O)C(C)(C)O)cc1)C(CCCCCCCC)CCCCCCCCC(=O)OCCOc1ccc(C(=O)C(C)(C)O)cc1]

Additional specific examples of compounds of this formula include those of the formula embodiments wherein m is 2, including (but not limited to) isomers of the formula

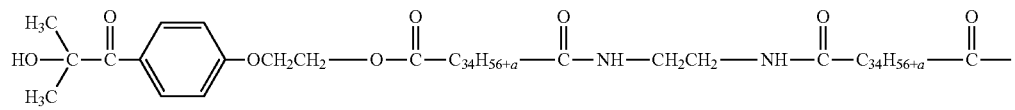

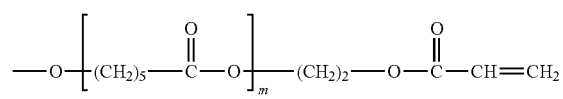

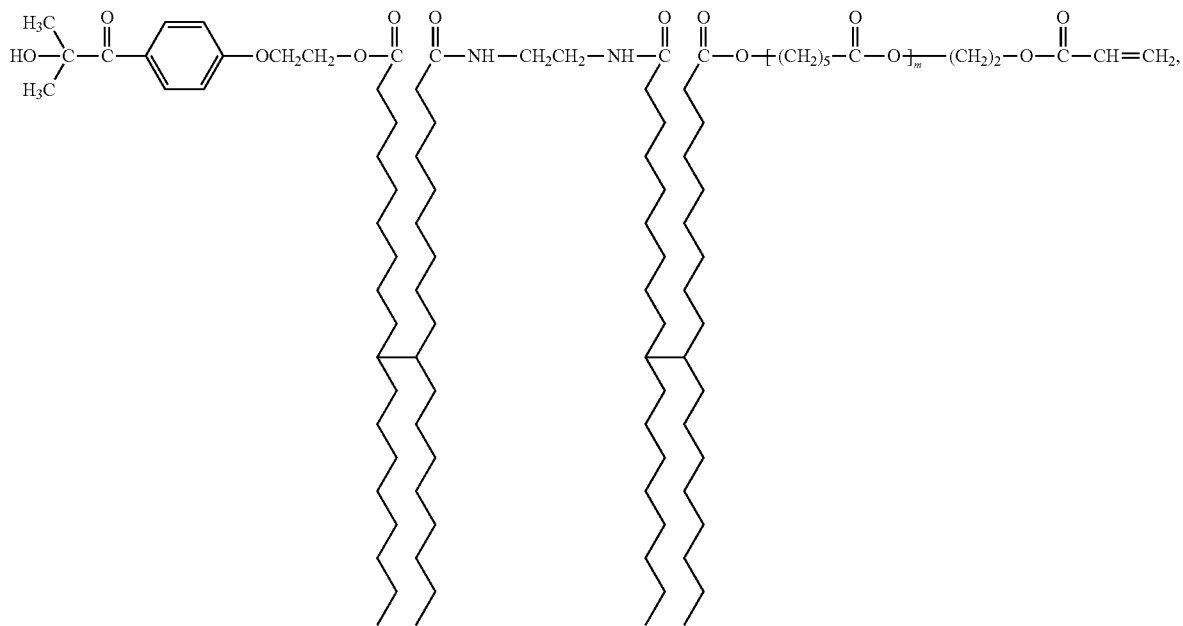
those of the formula
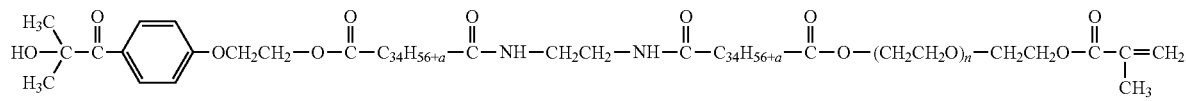
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein n is an integer, including but not limited to embodiments wherein n is 2 and wherein n is 5, including (but not limited to) isomers of the formula
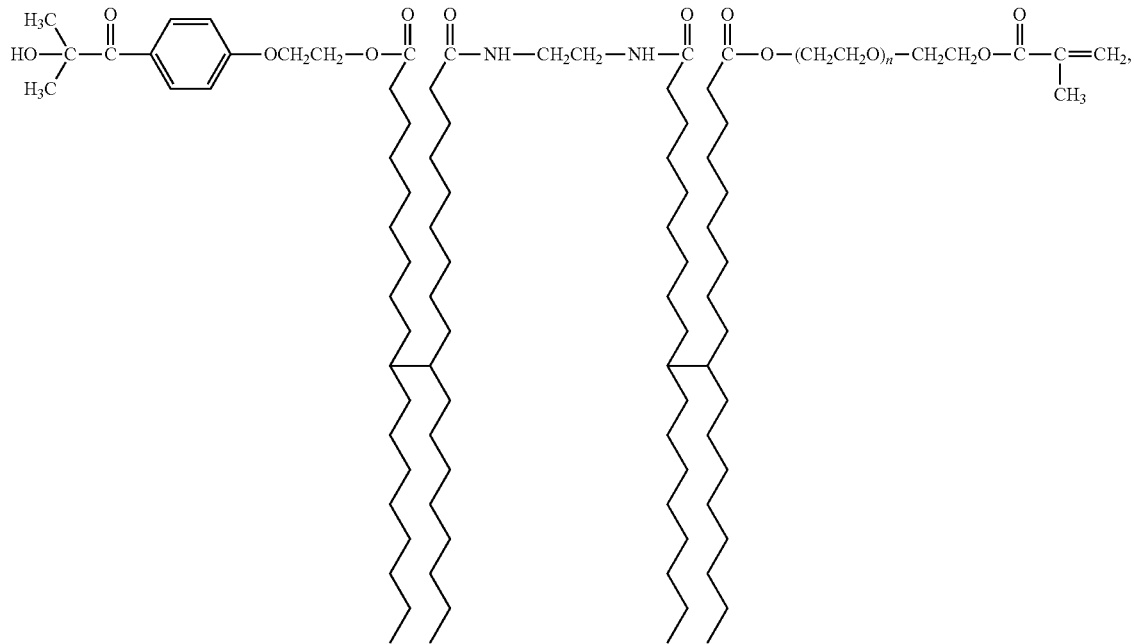

those of the formula

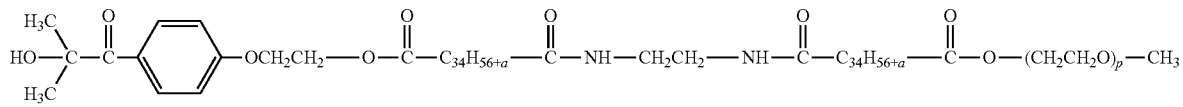

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein p is an integer, including but not limited to embodiments wherein p is 2 and wherein p is 3, including (but not limited to) isomers of the formula wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein q is an integer, including but not limited to embodiments wherein q is 2 and wherein q is 3, including (but not limited to) isomers of the formula

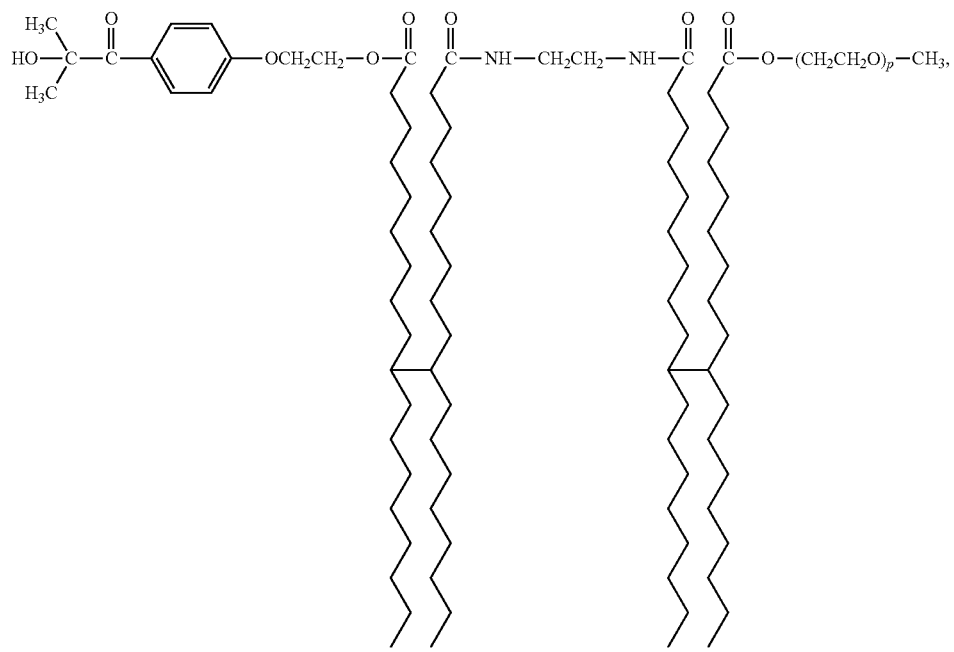

those of the formula

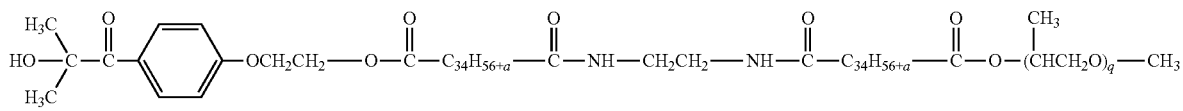

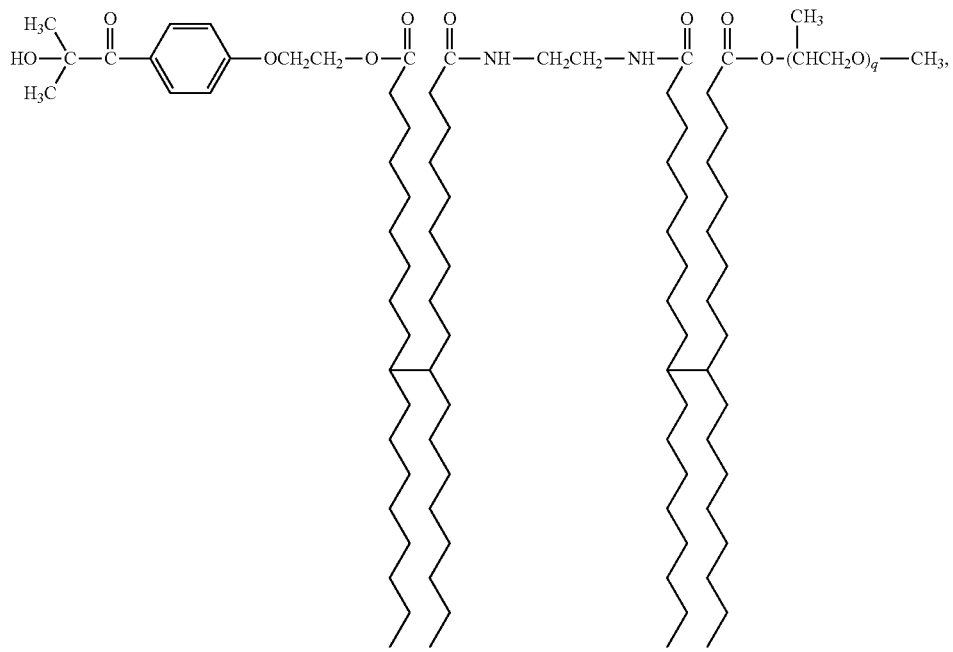
those of the formula
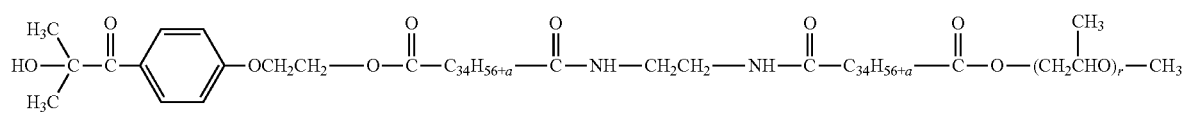
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein r is an integer, including but not limited to embodiments wherein r is 2 and wherein r is 3, including (but not limited to) isomers of the formula
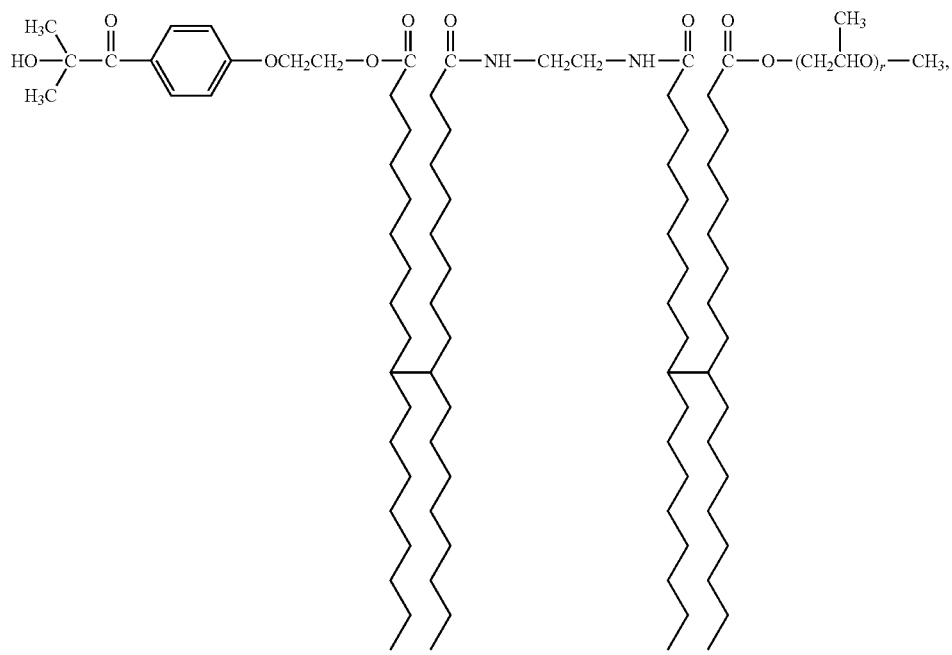
and the like, as well as mixtures thereof.

In embodiments, gellants herein can comprise materials disclosed in copending Application U.S. Ser. No. 11/290,121, filed Nov. 30, 2005, entitled "Phase Change Inks Containing Curable Amide Gellant Compounds," with the named inventors Eniko Toma, Jennifer L. Belelie, and Peter G. Odell, the disclosure of which is totally incorporated herein by reference, including a compound of the formula

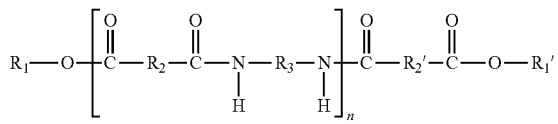

wherein $R_1$ and $R_1'$ each, independently of the other, is an alkyl group having at least one ethylenic unsaturation, an arylalkyl group having at least one ethylenic unsaturation, or an alkylaryl group having at least one ethylenic unsaturation, $R_2$, $R_2'$, and $R_3$ each, independently of the others, are alkylene groups, arylene groups, arylalkylene groups, or alkylarylene groups, and n is an integer representing the number of repeat amide units and is at least 1.

The gellant compounds as disclosed herein can be prepared by any desired or effective method.

For example, in embodiments, gellants can be prepared as described in U.S. Pat. No. 7,259,275, entitled "Method for Preparing Curable Amide Gellant Compounds," with the named inventors Jennifer L. Belelie, Adela Goredema, Peter G. Odell, and Eniko Toma, and the disclosure of which is totally incorporated herein by reference, which describes a process for preparing a compound of the formula

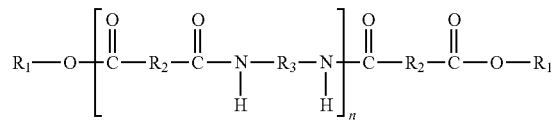

wherein $R_1$ is an alkyl group having at least one ethylenic unsaturation, an arylalkyl group having at least one ethylenic unsaturation, or an alkylaryl group having at least one ethylenic unsaturation, $R_2$ and $R_3$ each, independently of the others, are alkylene groups, arylene groups, arylalkylene groups, or alkylarylene groups, and n is an integer representing the number of repeat amide units and is at least 1, said process comprising: (a) reacting a diacid of the formula

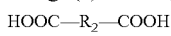

HOOC—$R_2$—COOH with a diamine of the formula

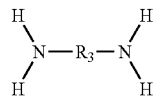

in the absence of a solvent while removing water from the reaction mixture to form an acid-terminated oligoamide intermediate; and (b) reacting the acid-terminated oligoamide intermediate with a monoalcohol of the formula

$R_1$—OH in the presence of a coupling agent and a catalyst to form the product.

The optional colorant, if present, may be present in a colored marking material in any desired amount, for example from about 0.5 to about 75% by weight of the marking material, for example from about 1 to about 50% or from about 1 to about 25%, by weight of the marking material.

Any suitable colorant can be used in embodiments herein, including dyes, pigments, or combinations thereof. As colorants, examples may include any dye or pigment capable of being dispersed or dissolved in the vehicle. Examples of suitable pigments include, for example, Paliogen Violet 5100 (BASF); Paliogen Violet 5890 (BASF); Heliogen Green L8730 (BASF); Lithol Scarlet D3700 (BASF); SUNFAST® Blue 15:4 (Sun Chemical 249-0592); HOSTAPERM Blue B2G-D (Clariant); Permanent Red P-F7RK; HOSTAPERM Violet BL (Clariant); Lithol Scarlet 4440 (BASF); Bon Red C (Dominion Color Company); Oracet Pink RF (Ciba); Paliogen Red 3871 K (BASF); SUNFAST® Blue 15:3 (Sun Chemical 249-1284); Paliogen Red 3340 (BASF); SUNFAST® Carbazole Violet 23 (Sun Chemical 246-1670); Lithol Fast Scarlet L4300 (BASF); Sunbrite Yellow 17 (Sun Chemical 275-0023); Heliogen Blue L6900, L7020 (BASF); Sunbrite Yellow 74 (Sun Chemical 272-0558); SPECTRA PAC® C Orange 16 (Sun Chemical 276-3016); Heliogen Blue K6902, K6910 (BASF); SUNFAST® Magenta 122 (Sun Chemical 228-0013); Heliogen Blue D6840, D7080 (BASF); Sudan Blue OS (BASF); Neopen Blue FF4012 (BASF); PV Fast Blue B2GO1 (Clariant); Irgalite Blue BCA (Ciba); Paliogen Blue 6470 (BASF); Sudan Orange G (Aldrich); Sudan Orange 220 (BASF); Paliogen Orange 3040 (BASF); Paliogen Yellow 152, 1560 (BASF); Lithol Fast Yellow 0991 K (BASF); Paliotol Yellow 1840 (BASF); Novoperm Yellow FGL (Clariant); Lumogen Yellow D0790 (BASF); Suco-Yellow L1250 (BASF); Suco-Yellow D1355 (BASF); Suco Fast Yellow DI 355, DI 351 (BASF); Hostaperm Pink E 02 (Clariant); Hansa Brilliant Yellow 5GX03 (Clariant); Permanent Yellow GRL 02 (Clariant); Permanent Rubine L6B 05 (Clariant); Fanal Pink D4830 (BASF); Cinquasia Magenta (Du Pont), Paliogen Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Wamer-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Example solvent dyes include spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

The radiation curable phase change inks herein can also optionally contain an antioxidant. The optional antioxidants can protect the images from oxidation and can also protect the ink components from oxidation during the heating portion of the ink preparation process. Specific examples of suitable antioxidant stabilizers include (but are not limited to) NAUGARD® 524, NAUGARD® 635, NAUGARD® A, NAUGARD® I-403, and NAUGARD® 959, commercially available from Crompton Corporation, Middlebury, Conn.; IRGANOX® 1010 and IRGASTAB® UV 10, commercially available from Ciba Specialty Chemicals; GENORAD 16 and GENORAD 40 commercially available from Rahn AG, Zurich, Switzerland, and the like, as well as mixtures thereof. When present, the optional antioxidant is present in the ink in any desired or effective amount, in one embodiment at least about 0.01 percent by weight of the ink carrier, in another embodiment at least about 0.1 percent by weight of the ink carrier, and in yet another embodiment at least about 1 percent by weight of the ink carrier, and in one embodiment no more than about 20 percent by weight of the ink carrier, in another embodiment no more than about 5 percent by weight of the ink carrier, and in yet another embodiment no more than about 3 percent by weight of the ink carrier, although the amount can be outside of these ranges.

The radiation curable phase change inks can also, if desired, contain additives to take advantage of the known functionality associated with such additives. Such additives may include, for example, defoamers, slip and leveling agents, pigment dispersants, surfactants, and the like, as well as mixtures thereof. The inks can also include additional monomeric or polymeric materials as desired.

Curing of the ink can be effected by exposure of the ink image to actinic radiation at any desired or effective wavelength, in one embodiment at least about 200 nanometers, and one embodiment no more than about 480 nanometers, although the wavelength can be outside of these ranges. Exposure to actinic radiation can be for any desired or effective period of time, in one embodiment for at least about 0.2 second, in another embodiment for at least about 1 second, and in yet another embodiment for at least about 5 seconds, and in one embodiment for no more than about 30 seconds, and in another embodiment for no more than about 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like.

The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C., although the jetting temperature can be outside of these ranges. At such low jetting temperatures, the conventional use of temperature differential between the jetted ink and the substrate upon which the ink is jetted to effect a rapid phase change in the ink (i.e., from liquid to solid) may not be effective. The gellant can thus be used to effect a rapid viscosity increase in the jetted ink upon the substrate. In particular, jetted ink droplets can be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase change transition in which the ink undergoes a significant viscosity change from a liquid state to a gel state (or semi-solid state).

In some embodiments, the temperature at which the ink forms the gel state is any temperature below the jetting temperature of the ink, in one embodiment any temperature that is about 5° C. or more below the jetting temperature of the ink. In one embodiment, the gel state can be formed at a temperature of at least about 25° C., and in another embodiment at a temperature of at least about 30° C., and in one embodiment of no more than about 100° C., in another embodiment of no more than about 70° C., and in yet another embodiment of no more than about 50° C., although the temperature can be outside of these ranges. A rapid and large increase in ink viscosity occurs upon cooling from the jetting temperature, at which the ink is in a liquid state, to the gel temperature, at which the ink is in the gel state. The viscosity increase is in one specific embodiment at least a $10^{2.5}$-fold increase in viscosity.

In specific embodiments, a direct to substrate fabrication process is selected. In other embodiments, an intermediate transfer surface can be used, for example, if the object is not that thick, although not limited. Further, a transfer drum patterned with indentations can be employed for some applications. It has been found that optimum transfer efficiency from an intermediate transfer surface to a final recording sheet and optimum print quality can be achieved if the viscosity of the ink image deposited on the intermediate transfer member is greatly increased after jetting the ink, so as to obtain a stable and transferable image that will not smear. A suitable gelling agent for the ink will gel the monomers/oligomers in the ink vehicle quickly and reversibly and will demonstrate a narrow phase change transition, for example within a temperature range of from about 30° C. to about 100° C., preferably of from about 30° C. to about 70° C., although the transition range can be outside of these temperature ranges. The gel state of the ink in one specific embodiment exhibits a minimum of $10^{2.5}$ centipoise, and in another specific embodiment $10^3$ centipoise, increase in viscosity at transferring temperatures, e.g., in one specific embodiment from about 30° C. to about 70° C., compared to the viscosity at the jetting temperature. One specific embodiment is directed to gellant containing inks that rapidly increase in viscosity within from about 5° C. to about 10° C. below the jetting temperature and ultimately reach a viscosity above $10^4$ times the jetting viscosity, and in another embodiment about $10^5$ times the jetting viscosity, although the viscosity can be outside of these ranges.

When the inks are in the gel state, the viscosity of the ink is in one embodiment at least about 1,000 centipoise, in another embodiment at least about 10,000 centipoise, and in yet another embodiment at least about 100,000 centipoise, although the viscosity can be outside of these ranges. Viscosity values in the gel state are in one embodiment at least about $10^3$ centipoise, and in another embodiment at least about $10^{4.5}$ centipoise, and in one embodiment no more than about $10^9$ centipoise, and in another embodiment no more than about $10^{6.5}$ centipoise, although the gel state viscosity can be outside of these ranges. The preferred gel phase viscosity can vary with the print process. For example, the highest viscosities are preferred when jetting directly to porous paper, or when employing intermediate transfer, in order to minimize the effects of ink bleed and feathering. On the other hand, less porous substrates such as plastic may lead to the use of lower ink viscosities that control dot gain and agglomeration of individual ink pixels. The gel viscosity can be controlled by ink formulation and substrate temperature. An additional benefit of the gel state for radiation curable inks is that higher viscosities of about $10^3$ to about $10^4$ centipoise can reduce oxygen diffusion in the ink, which in turn can lead to a faster rate of cure in free radical initiation. In the present system, the maximum viscosity reached exceeds these values (about $10^5$ to about $10^6$ cps).

For fabrication applications wherein the ink is printed onto an intermediate transfer member and subsequently transferred to a final substrate, the viscosity of the ink in one specific embodiment increases to about $10^6$ centipoise or greater at the intermediate transfer member temperature to facilitate adhesion to the intermediate transfer member, and for fabrication applications wherein the ink is printed directly onto a final substrate, the viscosity of the ink in one specific embodiment increases to $10^5$ centipoise or greater at the final substrate temperature to prevent the ink from soaking into the final substrate and/or to facilitate adhesion to the final substrate until curing by exposure to radiation. In one specific embodiment, the temperature of the final substrate or the intermediate transfer member onto which the ink is printed and at which the ink viscosity increases to about $10^5$ centipoise or greater is about 50° C. or lower.

In embodiments, an x, y, z movable substrate, stage, or build platform is employed to create a free object. That is, there is no final substrate since the three-dimensional product is the free, printed or fabricated object and not an image on a substrate. The removable build platform or support material can be any suitable material, for example, in embodiments, a non-curable material. Specific examples of suitable non-curable support materials include, but are not limited to, waxes, plastics, metals, wood, and glass, among others.

The ink compositions can be prepared by any desired or suitable method. For example, the ink ingredients can be mixed together, followed by heating, to a temperature in one embodiment of at least about 80° C., and in one embodiment of no more than about 120° C., although the temperature can be outside of these ranges, and stirring until a homogeneous ink composition is obtained, followed by cooling the ink to ambient temperature (typically from about 20° C. to about 25° C.). The inks are gels at ambient temperature.

The present ultraviolet curable gellant ink materials, as well as the methods herein, can be employed with any desired printing system including systems suitable for preparing three-dimensional objects, such as a solid object printer, thermal ink jet printer (both with inks liquid at room temperature and with phase change inks), piezoelectric ink jet printer (both with inks liquid at room temperature and with phase change inks), acoustic ink jet printer (both with inks liquid at room temperature and with phase change inks), thermal transfer printer, gravure printer, electrostatographic printing methods (both those employing dry marking materials and those employing liquid marking materials), and the like. In alternate embodiments, the ink materials can be used for manual preparation of three-dimensional objects, such as through the use of molds or by manual deposition of the ink material, to prepare a desired three-dimensional object.

In a specific embodiment, an ink jet printing device as described in commonly assigned, co-pending U.S. patent application of Gabriel Iftime et al, Ser. No. 11/683,011, entitled "Dual Printer for Regular and Raised Print," filed Mar. 7, 2007, incorporated by reference hereinabove in its entirety, is employed. The ink jet printing apparatus includes at least an ink jet print head and a print region surface toward which ink is jetted from the ink jet print head, wherein a height distance between the ink jet print head and the print region surface is adjustable. Therein, the ink jet print head is adjustable in spacing with respect to the print region surface so as to permit the ink jet print head to be moved from the a first position for regular height printing to a second height distance that is greater than (that is, the spacing between the ink jet print head and the print region surface is greater than) the first height distance. The second height distance is not fixed, and can be varied as necessary for a given printing. Moreover, the second height distance can itself be changed during a printing, as necessary. For example, it may be desirable to adjust the height distance from the first position to a second position as an image is built-up by the ink jet print head, and then as the image continues to be built-up, to adjust the ink jet print head from the second position to a third position in which the spacing from the print region surface is even further increased, and so on as necessary to complete build-up of the object.

The present disclosure encompasses fabrication of objects ranging from extremely small objects to extremely large objects. For example, objects of from about 1 micrometer to about to about 10,000 micrometers in height or longest dimension can be prepared, although the height is not limited to these ranges. An appropriate number of passes or ink jettings may be selected so that object can be built up to a desired total print height and a desired shape.

In three-dimensional printing, the printhead or target stage is movable in three dimensions, x, y, and z, enabling the build up of an object of any desired size. There are no limits to the height or overall size of an object that can be created; however, very large objects may require intermediate curing in the deposition process. In building up an image, for example by way of multiple passes of the print head over the portions of the image to include raised images, by depositing successive layers of ink so that the object, or a section of the object has a desired print height and geometry.

The ink jet head may support single color or full color printing. In full color printing, the ink jet head typically includes different channels for printing the different colors. The ink jet head may include four different sets of channels, for example one for each of cyan, magenta, yellow and black. In such embodiments, the print head is capable of printing either full color regular height prints when the ink jet head is set at a minimum distance from the print region surface, or raised height prints of any color when the ink jet head is at a distance greater than the minimum distance from the print region surface.

For example, the three dimensional objects can be formed with appropriate multiple passing of the ink jet print head over an area to achieve the desired object height and geometry. Jetting of ink from multiple different ink jets of the ink jet head toward a same location of the image during a single pass may also be used to form raised height objects. As discussed above, in embodiments, each layer of ink may add from about 4 μm to about 15 μm in height to the image height. Knowing the total print height desired the appropriate number of passes or jettings may be readily determined.

A controller may then control the ink jet print head to deposit the appropriate amount and/or layers of ink at locations of the image so as to obtain the image with the desired print heights and overall geometries therein.

The three-dimensional objects prepared herein can be free standing parts or objects, rapid prototyping devices, raised structures on substrates, such as, for example, topographical maps, or other desired objects. Any suitable substrate, recording sheet, or removable support, stage, platform, and the like, can be employed for depositing the three-dimensional objects thereon, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMWLL LASERPRINT® paper, and the like, glossy coated papers such as XEROX® Digital Color Gloss, Sappi Warren Papers LUSTROGLOSS®, and the like, transparency materials, fabrics, textile products, plastics, polymeric films, inorganic substrates such as metals and wood, as well as meltable or dissolvable substrates, such as waxes or salts, in the case of removable supports for free standing objects, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

An ultra-violet curable phase change gellant ink was prepared containing 7.5 percent by weight curable amide gellant as described in Example VIII of U.S. Pat. No. 7,279,587 which is totally incorporated by reference herein, 5 percent by weight Unilin 350™ acrylate wax, 5 percent by weight pentafunctional acrylate monomer (SR 399LV dipentaerythritol pentaacrylate available from Sartomer Co., Inc.), 72.8 percent by weight difunctionalacrylate monomer (propoxylated neopentyl glycol diacrylate SR 9003 available from Sartomer Co., Inc.), 3 percent by weight IRGACURE® 379 photoinitiator (obtained from Ciba Specialty Chemicals), 1 percent by weight IRGACURE® 819 photoinitiator (obtained from Ciba Specialty Chemicals), 3.5 percent by weight IRGACURE® 127 photoinitiator (obtained from Ciba Specialty Chemicals), and 2 percent by weight DAROCUR® ITX photoinitiator (obtained from Ciba Specialty Chemicals) and 0.24 percent by weight UV stabilizer (IRGASTAB® UV10, obtained from Ciba Specialty Chemicals). All of the components were stirred together at 90° C. for 1 hour.

The ink material was melted at 90° C. and the fluid ink was dispensed by hand from a glass pipette onto a sheet of uncoated Mylar®. Due to the phase change nature of the ink, the dispensed fluid rapidly gelled on contact with the room temperature Mylar allowing the formation of free-standing structures several millimeters in height. FIG. 1 illustrates a free-standing post alongside a ruler, following UV-curing, created from the deposition of the present phase change ink material onto a room temperature substrate. The deposited three-dimensional structure was then cured by exposure to UV light from a UV Fusion LC-6B Benchtop Conveyor equipped with UV Fusion Light Hammer 6 Ultraviolet Lamp System employing a "D" bulb for a minimum of 1 seconds to provide polymer posts which are remarkably robust. Example 1 demonstrates the robustness of the final product as well as the ease with which macro scale three-dimensional objects can be created with the present material and method.

In embodiments, the present curable gellant inks can contain colorants, functional particles, or nanoparticles, and the like, for example up to about 10 weight percent of such colorants or particles, to provide color on demand three dimensional objects and objects containing functional particles or nanoparticles. For example, in embodiments, functional particles or nanoparticles can be selected from the group consisting of metals, semiconductors, silicas, metal oxides, and pigments, and combinations thereof.

Example 2

Figure 2:
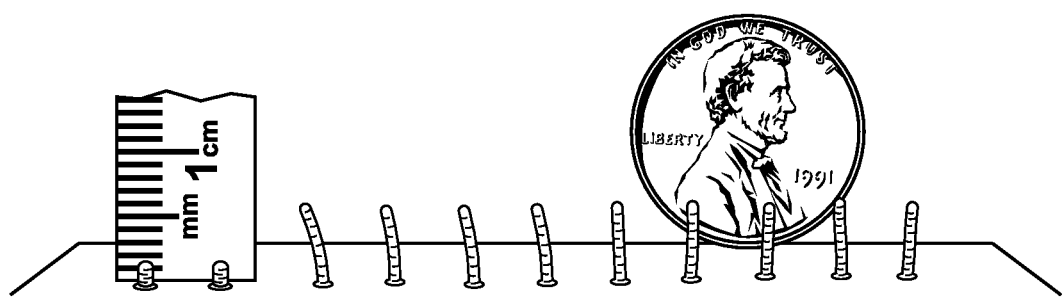
FIG. 2 is an illustration of a free-standing post created by jetting the present ink material onto a substrate using a piezoelectric ink jet printer followed by curing of the object.

The ultra-violet curable phase change gellant ink of Example 1 was digitally printed using a modified Xerox Phaser® 860 printer. A Xerox piezoelectric ink jet print head, oriented horizontal to the substrate, was fired for a predetermined number of 0.5 second bursts with increasing number of bursts resulting in taller structures. In Example 2, every third jet was fired resulting in a 5.5 millimeter space between posts. FIG. 2 illustrates free-standing posts of 6 millimeters and 1.7 millimeters (inset of FIG. 2) that were ink jetted on to room temperature Mylar as described in Example 2. After printing, the markings were cured by exposure to UV light from a UV Fusion LC-6B Benchtop Conveyor equipped with UV Fusion Light Hammer 6 Ultraviolet Lamp System employing a "D" bulb for a minimum of 1 seconds to provide robust structures.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A method for fabricating a three-dimensional object comprising:
   depositing a first amount of an ultraviolet curable phase change ink composition comprising an optional colorant and a phase change ink vehicle comprising a radiation curable monomer or prepolymer; a photoinitiator; a reactive wax; and a gellant upon a print region surface;
   successively depositing additional amounts of the ultraviolet curable phase change ink composition to create a three-dimensional object; and
   curing the ultraviolet curable phase change ink composition;
   wherein multiple layers of the curable ink object are cured upon completion of deposition of a last of the multiple layers of the object;
   wherein the gellant is a compound of the formula

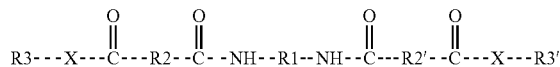

wherein R~ is (i) an alkylene group, including linear and branched, saturated and unsaturated, cyclic and acyclic, and substituted and unsubstituted alkylene groups, and wherein heteroatoms either may or may not be present in the alkylene group, (ii) an arylene group, including substituted and unsubstituted arylene groups, and wherein heteroatoms either may or may not be present in the arylene group, (iii) an arylalkylene group, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) an alkylarylene group, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, R2 and R2' each, independently of the other, are (i) alkylene groups, including linear and branched, saturated and unsaturated, cyclic and acyclic, and substituted and unsubstituted alkylene groups, and wherein heteroatoms either may or may not be present in the alkylene group, (ii) arylene groups, including substituted and unsubstituted arylene groups, and wherein heteroatoms either may or may not be present in the arylene group, (iii) arylalkylene groups, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) alkylarylene groups, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, R3 and R3' each, independently of the other, are either (a) photoinitiating groups, or (b) groups which are (i) alkyl groups, including linear and branched, saturated and unsaturated, cyclic and acyclic, and substituted and unsubstituted alkyl groups, and wherein heteroatoms either may or may not be present in the alkyl group, (ii) aryl groups, including substituted and unsubstituted aryl groups, wherein heteroatoms either may or may not be present in the aryl group, (iii) arylalkyl groups, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (iv) alkylaryl groups, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, and X and X' each, independently of the other, is an oxygen atom or a group of the formula —NR4-, wherein R4 is (i) a hydrogen atom, (ii) an alkyl group, including linear and branched, saturated and unsaturated, cyclic and acyclic, and substituted and unsubstituted alkyl groups, and wherein heteroatoms either may or may not be present in the alkyl group, (iii) an aryl group, including substituted and unsubstituted aryl groups, and wherein heteroatoms either may or may not be present in the aryl group, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group.

2. The method according to claim 1, wherein the method for fabricating the three-dimensional object comprises digital fabrication.

3. The method according to claim 1, wherein depositing comprises manual deposition of the ultraviolet curable phase change ink composition.

4. The method according to claim 1, wherein depositing comprises manual deposition of the ultraviolet curable phase change ink composition into a mold.

5. The method according to claim 1, wherein depositing comprises depositing onto a substrate, stage, or removable support.

6. The method according to claim 1, wherein depositing comprises depositing onto an x, y, z movable build platform.

7. The method according to claim 1, wherein depositing the ultraviolet curable phase change ink composition comprises depositing with an ink jet printing apparatus.

8. The method according to claim 1, wherein depositing the ultraviolet curable phase change ink composition comprises depositing with a piezoelectric ink jet printing apparatus.

9. The method according to claim 1, wherein the print region surface comprises a substrate selected from the group consisting of plain paper, ruled notebook paper, bond paper, silica coated paper, glossy coated paper, transparency materials, fabrics, textile products, plastics, polymeric films, metal, wood, wax, and salts.

10. The method according to claim 1, wherein the at least one curable monomer or prepolymer is a multifunctional acrylate or methacrylate compound.

11. The method according to claim 10, wherein the multifunctional acrylate or methacrylate compound is propoxylated neopentyl glycol diacrylate, pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, hexanediol diacrylate, tripropylene glycol diacrylate, dipropylene glycol diacrylate, amine modified polyether acrylate, trimethylolpropane triacrylate, glycerol propoxylate triacrylate, dipentaerythritol pentaacrylate, dipentaerythritol hexaacrylate, ethoxylated pentaerythritol tetraacrylate, or mixtures or combinations thereof.

12. The method according to claim 1, wherein the photoinitiator is selected from the group consisting of benzyl ketones, monomeric hydroxyl ketones, α-alkoxy benzyl ketones, α-amino ketones, acyl phosphine oxides, metallocenes, benzophenone, benzophenone derivatives, isopropyl thioxanthenones, arylsulphonium salts and aryl iodonium salts.

13. The method according to claim 1, wherein the reactive wax is a hydroxyl-terminated polyethylene wax functionalized with a polymerizable group.

14. The method according to claim 1, wherein the gellant is a mixture of

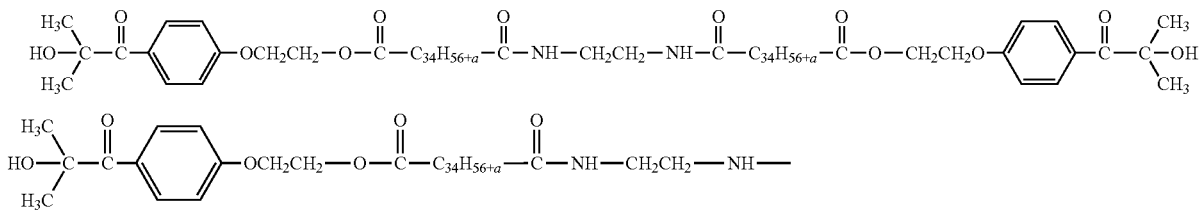

-continued

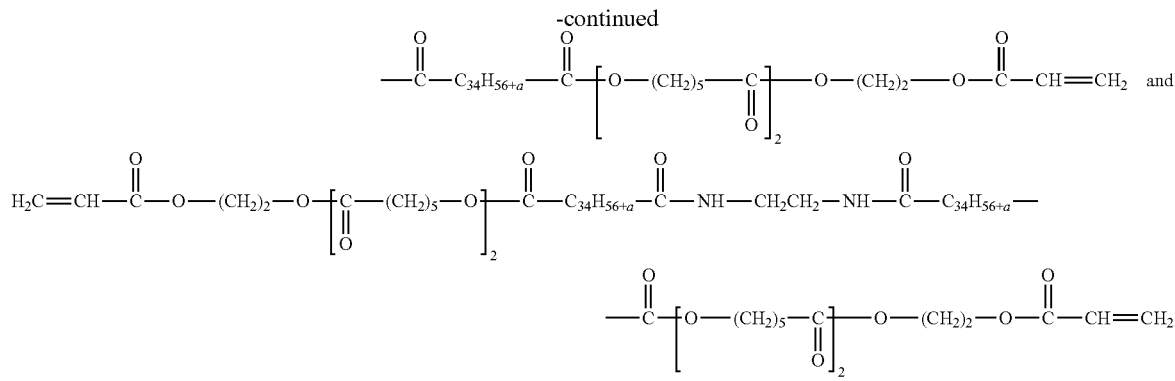

wherein —$C_{34}H_{56+a}$— represents a branched alkylene group, which may or may not include unsaturations and cyclic groups, substituted and unsubstituted alkylene groups, and wherein heteroatoms either may or may not be present in the alkylene group, wherein a is an integer of 0, 1, 2, 3, 4, 5, 6, 7, 8, 9, 10, 11, or 12.

15. The method according to claim 1, wherein the ultraviolet curable phase change ink composition further comprises a functional particle or nanoparticle selected from the group consisting of metals, semiconductors, silicas, metal oxides, and pigments.

16. The method according to claim 1, wherein each layer of the curable ink in a multilayer object is cured prior to deposition of a subsequent layer.

17. The method according to claim 1, comprising depositing successive layers of the curable ink to form an object having a selected height and shape.

* * * * *